US012649190B2

(12) United States Patent
Baer et al.

(10) Patent No.: US 12,649,190 B2
(45) Date of Patent: Jun. 9, 2026

(54) MODULAR DRILL HAVING CLAMP AND BUMP SURFACES FOR LOCKING AND UNLOCKING AN INSERT

(71) Applicant: Kennametal Inc., Latrobe, PA (US)

(72) Inventors: Austin C. Baer, Irwin, PA (US); Ruy Frota de Souza, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 631 days.

(21) Appl. No.: 17/847,237

(22) Filed: Jun. 23, 2022

(65) Prior Publication Data

US 2023/0415246 A1      Dec. 28, 2023

(51) Int. Cl.
B23B 51/02          (2006.01)
B23B 51/00          (2006.01)

(52) U.S. Cl.
CPC ................................. B23B 51/0004 (2022.01)

(58) Field of Classification Search
CPC ............ B23B 51/0003; B23B 51/0002; B23B 2251/02; B23B 51/02; B23B 2270/08; B23B 2270/09
See application file for complete search history.

(56) References Cited

U.S. PATENT DOCUMENTS

| | | |
|---|---|---|
| 2010/0322723 A1 | 12/2010 | Danielsson |
| 2011/0110739 A1 | 5/2011 | Frisendahl |
| 2011/0236145 A1 | 9/2011 | Pabel et al. |
| 2015/0360300 A1 | 12/2015 | Hecht |
| 2018/0169771 A1* | 6/2018 | Frota de Souza Filho .................. B23B 51/02 |
| 2019/0126361 A1 | 5/2019 | Hecht et al. |
| 2020/0180047 A1* | 6/2020 | Jager ................... B23B 31/1075 |

FOREIGN PATENT DOCUMENTS

CN          109365844 A      2/2019

* cited by examiner

*Primary Examiner* — Alan Snyder
(74) *Attorney, Agent, or Firm* — Christopher J. Owens

(57)          ABSTRACT
A modular drill includes a drill body, an insert, and a retaining member. The drill body includes a center hole extending through a first surface of the drill body, and a side hole extending at an actuation location through a second surface of the drill body. The center hole and the side hole intersect within the drill body. The insert is moveably disposed in the center hole. The retaining member is threadedly attached to and moveably disposed in the side hole. The retaining member includes a clamp surface and a bump surface. The clamp surface is disposed closer to the actuation location than the bump surface. When the retaining member is rotated in one direction the clamp surface forces the insert into a locked position. When the retaining member is rotated in another direction the bump surface bumps the insert out of the locked position.

15 Claims, 16 Drawing Sheets

MODULAR DRILL HAVING CLAMP AND BUMP SURFACES FOR LOCKING AND UNLOCKING AN INSERT

FIELD OF THE DISCLOSURE

The disclosure relates to modular drills having clamp and bump surfaces to lock and unlock an insert from the modular drill.

BACKGROUND

Modular drills may require rear access of a tool for locking and unlocking an insert. Users may experience difficulty removing an insert from the modular drill due to the amount of force required to unlock the insert from the modular drill. In other modular drills, a large diameter screw or pin may be used to assist in removing the insert. This leads to increased cost. Moreover, this requires a larger hole in the drill body to accommodate the large diameter screw or pin. This reduces the strength of the drill body in a critical area where cracks can develop and further reduces the room available for coolant holes.

An improved modular drill is needed to reduce one or more issues associated with one or more of the current modular drills.

SUMMARY

In one embodiment, a modular drill includes a drill body, an insert, and a retaining member. The drill body includes a center hole extending through a first surface of the drill body, and a side hole extending at an actuation location through a second surface of the drill body. The center hole and the side hole intersect within the drill body. The insert is moveably disposed in the center hole. The retaining member is threadedly attached to and moveably disposed in the side hole. The retaining member includes a clamp surface and a bump surface. The clamp surface is disposed closer to the actuation location than the bump surface. When the retaining member is rotated in a first direction in the side hole the clamp surface forces the insert into a locked position within the center hole of the drill body. When the retaining member is rotated in a second direction, opposite to the first direction, in the side hole the bump surface bumps the insert out of the locked position allowing the insert to be removed from the center hole of the drill body.

In another embodiment, a modular drill includes a drill body, an insert, and a retaining member. The drill body includes a center hole extending through a first surface of the drill body, and a side hole extending at an actuation location through a second surface of the drill body. The center hole and the side hole intersect within the drill body. The insert is moveably disposed in the center hole. The retaining member is moveably disposed in the side hole. The retaining member includes a torque screw threadedly attached to the side hole, the torque screw comprising a torque nut and a lock-rod pin rotatably attached to the torque nut. The lock-rod pin includes a clamp surface and a bump surface. When the retaining member is rotated in a first direction in the side hole the clamp surface forces the insert into a locked position within the center hole of the drill body. When the retaining member is rotated in a second direction, opposite to the first direction, in the side hole the bump surface bumps the insert out of the locked position allowing the insert to be removed from the center hole of the drill body.

In still another embodiment, a modular drill includes a drill body, an insert, and a retaining member. The drill body includes a center hole extending through a top surface of the drill body, and a side hole extending completely through the drill body from an actuation location through an entrance location. The side hole includes a first portion having a first diameter at the actuation location and a second portion having a second diameter at the entrance location. The second diameter is larger than the first diameter. The center hole and the side hole intersect within the drill body. The insert is moveably disposed in the center hole. The entrance location is disposed below both the insert and the actuation location. The retaining member is threadedly attached to and moveably disposed in the side hole. The retaining member includes a clamp surface and a bump surface. When the retaining member is rotated in a first direction in the side hole the clamp surface forces the insert into a locked position within the center hole of the drill body. When the retaining member is rotated in a second direction, opposite to the first direction, in the side hole the bump surface bumps the insert out of the locked position allowing the insert to be removed from the center hole of the drill body.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figures 1, 2:
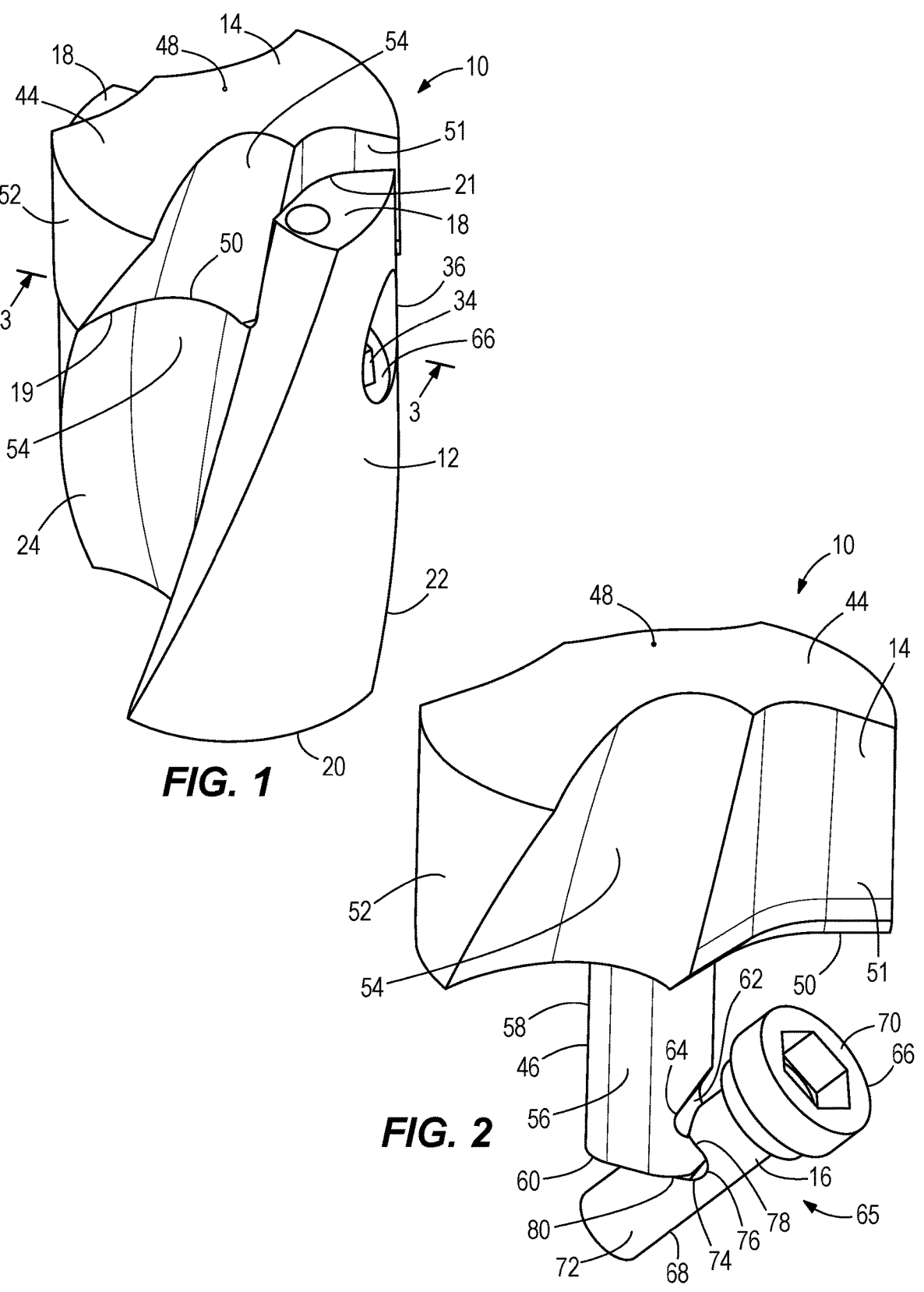
FIG. 1 illustrates a front perspective view of one embodiment of a modular drill.
FIG. 2 illustrates a front perspective view of the modular drill of FIG. 1 with the drill body removed to show the insert and the retaining member.

As shown collectively in FIGS. 1-5, in one embodiment a modular drill 10 includes a drill body 12, an insert 14, and a retaining member 16. The drill body 12 comprises top surfaces 18, abutment surface 19, bottom surface 20, inner walls 21 extending between the top surfaces 18 and the abutment surface 19, and outer surfaces 22 extending between the top surfaces 18 and the bottom surface 20. The outer surfaces 22 are convex. Flutes 24 are cut into the outer surfaces 22. The flutes 24 extend between the abutment surface 19 and the bottom surface 20. The flutes 24 are concave for carrying material cut by the modular drill 10 away from the insert 14. A center hole 26 extends through the abutment surface 19. The center hole 26 comprises first portion 28, second portion 30, and third portion 32. The distance 28A of the first portion 28, which varies, is larger than the diameter 30A of the second portion 30. The diameter 30A of the second portion 30 is larger than the diameter 32A of the third portion 32. A side hole 34 extends at an actuation location 36 through one of the outer surfaces 22. The side hole 34 comprises first portion 38, second portion 40, and third portion 42. The diameter 38A of the first portion 38 is larger than the diameter 40A of the second portion 40. The diameter 42A of the third portion 42 is larger than the diameter 40A of the second portion 40. The center hole 26 and the side hole 34 intersect within the drill body 12 at a non-perpendicular angle. In other embodiments, the center hole 26 and the side hole 34 may intersect within the drill body 12 at a perpendicular angle.

The insert 14 comprises a first portion 44 and a second portion 46. The first portion 44 and the second portion 46 form one integral component. In other embodiments, the first portion 44 and the second portion 46 may comprise separate attached components. The first portion 44 comprises a head of the insert 14. The first portion 44 comprises cutting surface 48, axial abutment surface 50, abutment surfaces 51, and outer surfaces 52. The abutment surfaces 51 and the outer surfaces 52 both extend between cutting surface 48 and axial abutment surface 50. Flutes 54 are cut into the outer surfaces 52. The flutes 54 extend between cutting surface 48 and axial abutment surface 50. The second portion 46 comprises a stem 56 of the insert 14. The stem 56 comprises outer surface 58 and bottom surface 60. Mating member 62 is cut into the stem 56. Mating member 62 comprises a notch 64. In other embodiments, the mating member 62 may vary.

The retaining member 16 comprises a torque screw 65 comprising a first portion 66 and a second portion 68. The first portion 66 of the torque screw 65 comprises a torque nut 70 and the second portion 68 comprises a lock-rod pin 72. The torque nut is rotatably attached to the lock-rod pin 72 to rotate relative to the lock-rod pin 72. The lock-rod pin 72 comprises a mating member 74 cut into the lock-rod pin 72. Mating member 74 comprises a notch 76. The notch 76 comprises a clamp surface 78 and a bump surface 80 which are disposed non-parallel relative to one another. In other embodiments, the mating member 74 may vary.

Figure 3:
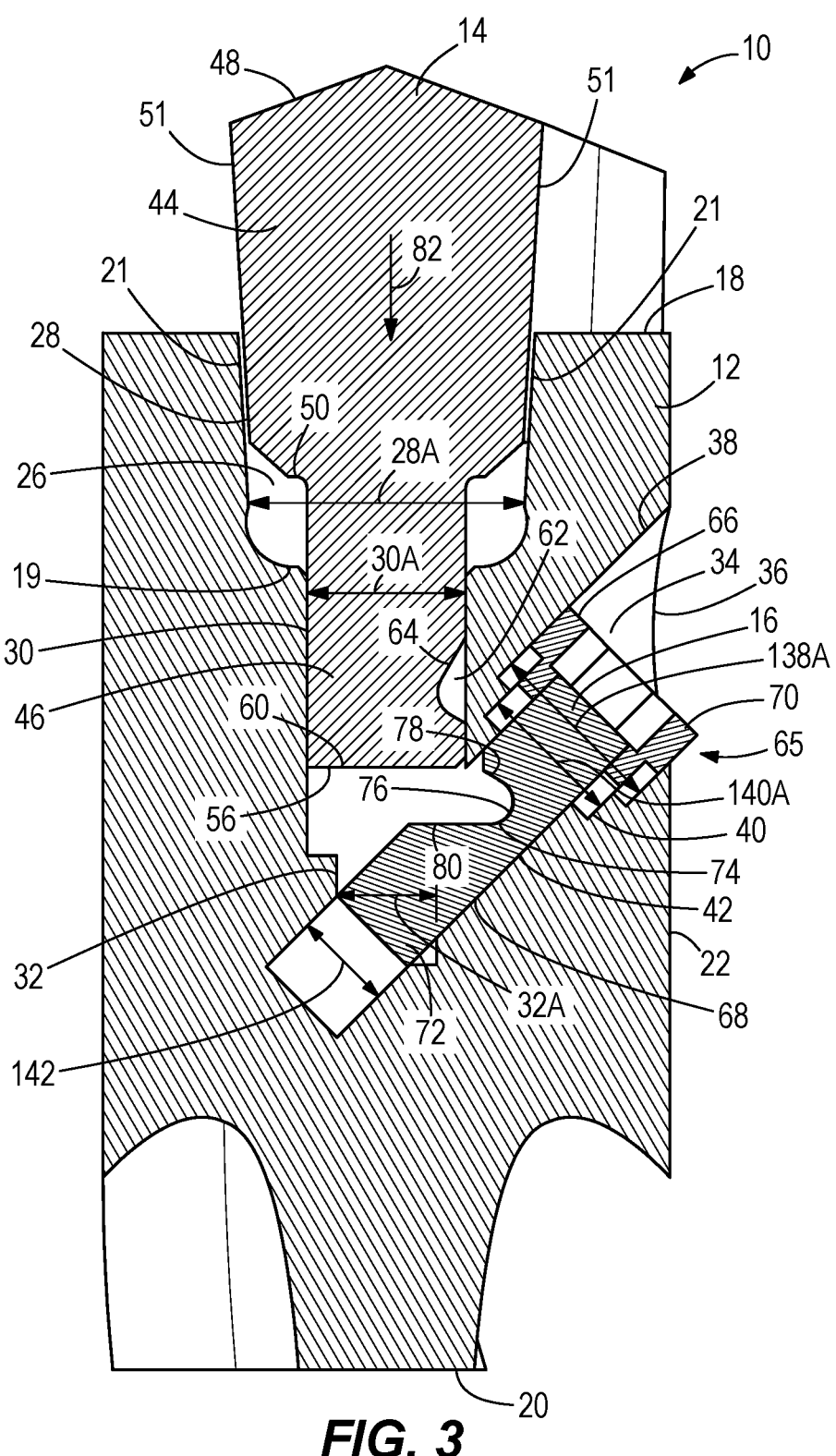
FIG. 3 illustrates a cross-section view through line 3-3 of FIG. 1 with the retaining member retracted and the insert in an unlocked position.

As shown in FIG. 3, when the insert 14 is initially installed into the center hole 26 of the drill body 12 of the modular drill 10, the retaining member 16 is partially retracted within the side hole 34 so that the clamp surface 78 of the retaining member 16 is not blocking the second portion 30 of the center hole 26. At this time, the stem 56 of the insert 14 is inserted through the first portion 28 of the center hole 26 into the second portion 30 of the center hole 26 in direction 82 until the angled inner walls 21 of the drill body 12 press against the abutment surfaces 51 of the first portion 44 of the insert 14 with enough force to prevent further movement of the insert 14.

Figure 4:
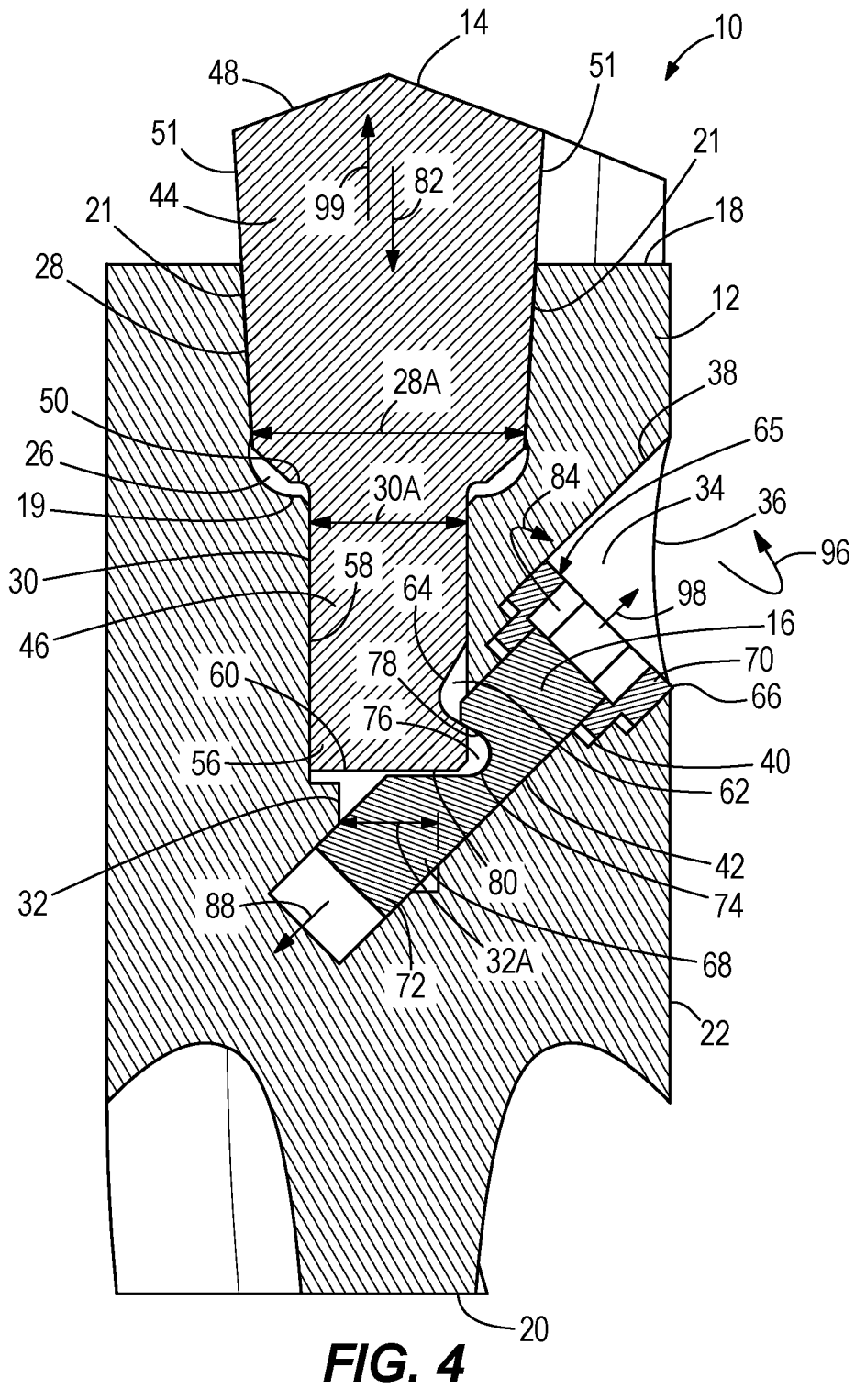
FIG. 4 illustrates a cross-section view through line 3-3 of FIG. 1 with the retaining member advancing towards a clamping position but the insert still in an unlocked position.

When this happens, as shown in FIG. 4, the notch 64 of the stem 56 of the insert 14 is disposed adjacent the side hole 34. The torque nut 70 of the retaining member 16 is then rotated, using a tool (not shown) inserted through the actuation location 36, in direction 84 within the side hole 34 so that the retaining member 16 advances in direction 88 within the side hole 34. This causes the clamp surface 78 of the lock-rod pin 72 to contact the notch 64 of the stem 56 of the insert 14. The torque nut 70, the lock-rod pin 72, and the side hole 34 of the drill body 12 are threaded in such a way that rotation of the torque nut 70 creates axial movement of the lock-rod pin 72.

Figure 5:
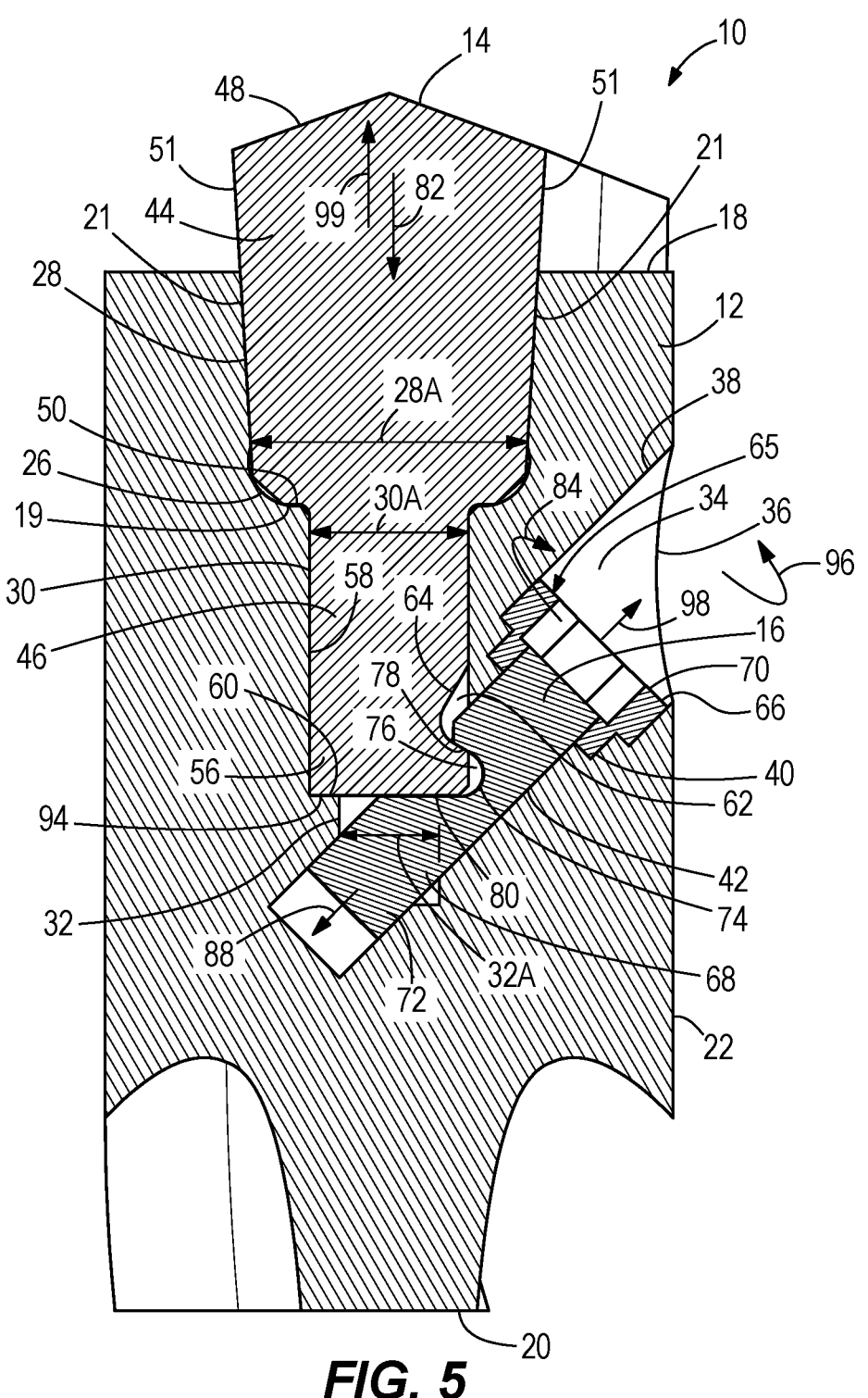
FIG. 5 illustrates a cross-section through line 3-3 of FIG. 1 with the retaining member having advanced into a clamping position locking the insert in place in a locked position.
Figures 6, 7:
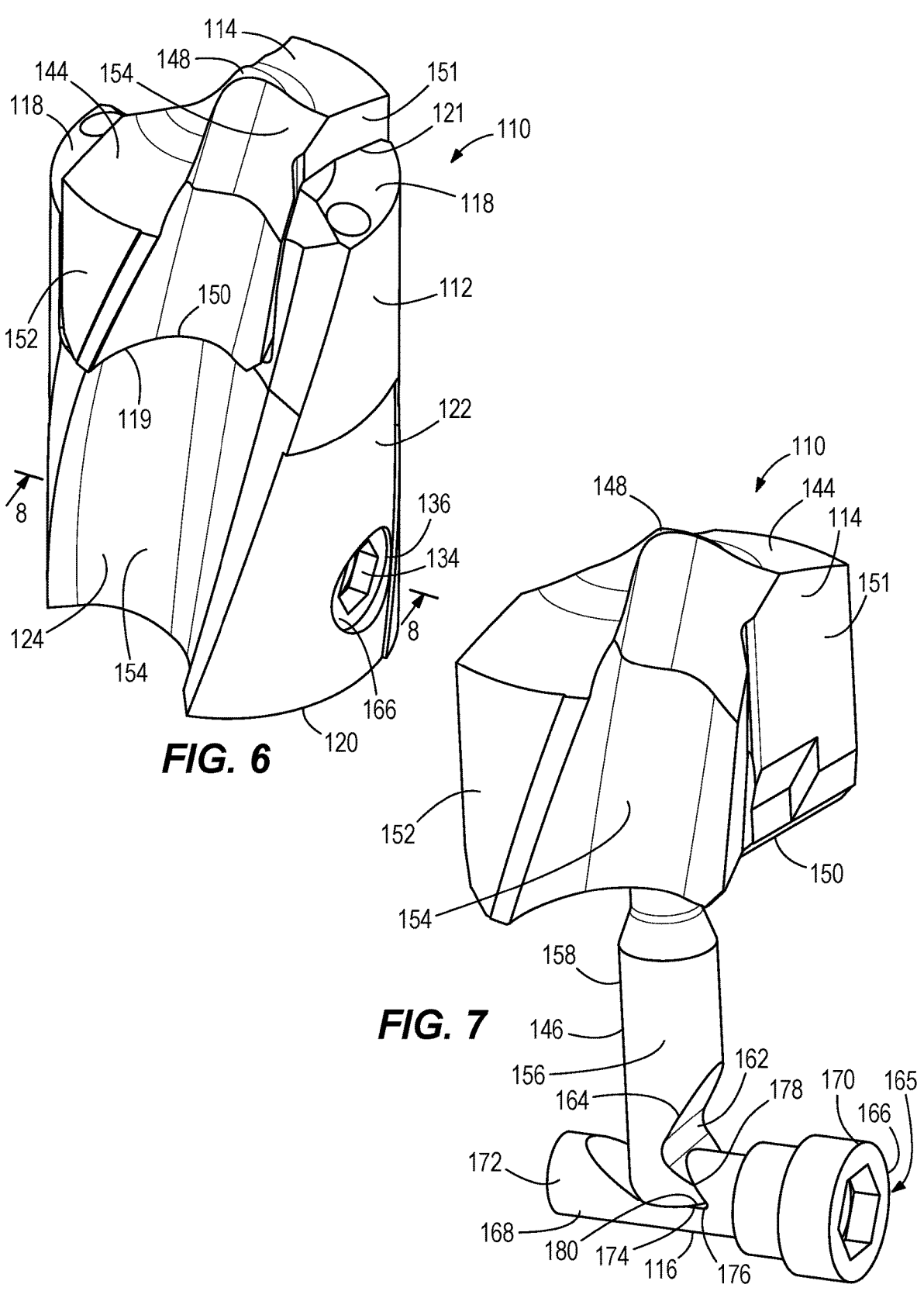
FIG. 6 illustrates a front perspective view of another embodiment of a modular drill.
FIG. 7 illustrates a front perspective view of the modular drill of FIG. 6 with the drill body removed to show the insert and the retaining member.

As shown in FIG. 5, as the torque nut 70 of the retaining member 16 is rotated further in direction 84 within the side hole 34 the lock-rod pin 72 advances further in direction 88 so that the clamp surface 78 of the lock-rod pin 72 pushes against the notch 64 of the stem 56 of the insert 14 forcing the insert 14 to move in direction 82 in the center hole 26 into a locked position within the center hole 26 of the drill body 12. At this time, the torque nut 70 cannot be rotated further in direction 84. Moreover, at this time, the insert 14 cannot move further in direction 82 within the center hole 26 of the drill body 12 due to axial abutment surface 50 of the insert 14 abutting against abutment surface 19 of the drill body 12. At this point the insert 14 and the drill body 12 will form an interference fit providing a secure coupling.

To bump the insert 14 out of the locked position in the center hole 26 of the drill body 12, as shown in FIG. 4, the torque nut 70 is rotated using the tool (not shown) inserted through the actuation location 36 in direction 96, opposite to direction 84, in the side hole 34 causing the retaining member 16 to move in direction 98 within the side hole 34. This causes the bump surface 80 to bump against the bottom surface 60 of the stem 56 of the insert 14 forcing the insert 14 to move in direction 99 which bumps the insert 14 out of the locked position allowing the insert 14 to be removed from the center hole 26 of the drill body 12. It is noted that the clamp surface 78 of the retaining member 16 is disposed closer to the actuation location 36 of the drill body 12 than the bump surface 80 of the retaining member 16. The position and length of bump surface 80 creates a limit position for the insert 14 before the clamping can be done. Depending on manufacturing tolerances of drill body distance 28A and correspondent distance between abutment surfaces 51 of insert 14, the location of the insert 14 as it is placed into the drill body 12 can vary, so bump surface 80 can act as a stop preventing insert 14 from dropping to a position where the mating members 74 and 62 cannot engage properly during clamping.

As shown collectively in FIGS. 6-10, in another embodiment a modular drill 110 includes a drill body 112, an insert 114, and a retaining member 116. The drill body 112 comprises top surfaces 118, abutment surface 119, bottom surface 120, inner walls 121 extending between the top surfaces 118 and the abutment surface 119, and outer surfaces 122 extending between the top surfaces 118 and the bottom surface 120. The outer surfaces 122 are convex. Flutes 124 are cut into the outer surfaces 122. The flutes 124 extend between the abutment surface 119 and the bottom surface 120. The flutes 124 are concave for carrying material cut by the modular drill 110 away from the insert 114. A center hole 126 extends through the abutment surface 119. The center hole 126 comprises first portion 128, and second portion 130. The distance 128A of the first portion 128, which varies, is larger than the diameter 130A of the second portion 130. A side hole 134 extends at an actuation location 136 through one of the outer surfaces 122. The side hole 134 comprises first portion 138, second portion 140, and third portion 142. The diameter 138A of the first portion 138 is larger than the diameter 140A of the second portion 140. The diameter 142A of the third portion 142 is larger than the diameter 140A of the second portion 140. The center hole 126 and the side hole 134 intersect within the drill body 112 at a perpendicular angle. In other embodiments, the center hole 126 and the side hole 134 may intersect within the drill body 112 at various angles.

The insert 114 comprises a first portion 144 and a second portion 146. The first portion 144 comprises a head of the insert 114 and the second portion 146 comprises an attached pin of the insert 114. The first portion 144 comprises cutting surface 148, axial abutment surface 150, abutment surfaces 151, and outer surfaces 152. The abutment surfaces 151 and the outer surfaces 152 both extend between cutting surface 148 and axial abutment surface 150. Flutes 154 are cut into the outer surfaces 152. The flutes 154 extend between cutting surface 148 and axial abutment surface 150. The second portion 146 comprises a stem 156. The stem 156 comprises outer surface 158, bottom surface 160, and adjacent surface 161 which is adjacent to the bottom surface 160. Mating member 162 is cut into the stem 156. Mating member 162 comprises a notch 164. In other embodiments, the mating member 162 may vary.

The retaining member 116 comprises a torque screw 165 comprising a first portion 166 and a second portion 168. The first portion 166 of the torque screw 165 comprises a torque nut 170 and the second portion 168 comprises a lock-rod pin 172. The torque nut 170 is rotatably attached to the lock-rod pin 172 to rotate relative to the lock-rod pin 172. The lock-rod pin 172 comprises a mating member 174 cut into the lock-rod pin 172. Mating member 174 comprises a notch 176. The notch 176 comprises a clamp surface 178 and a bump surface 180 which are disposed non-parallel relative to one another. In other embodiments, the mating member 174 may vary.

Figure 8:
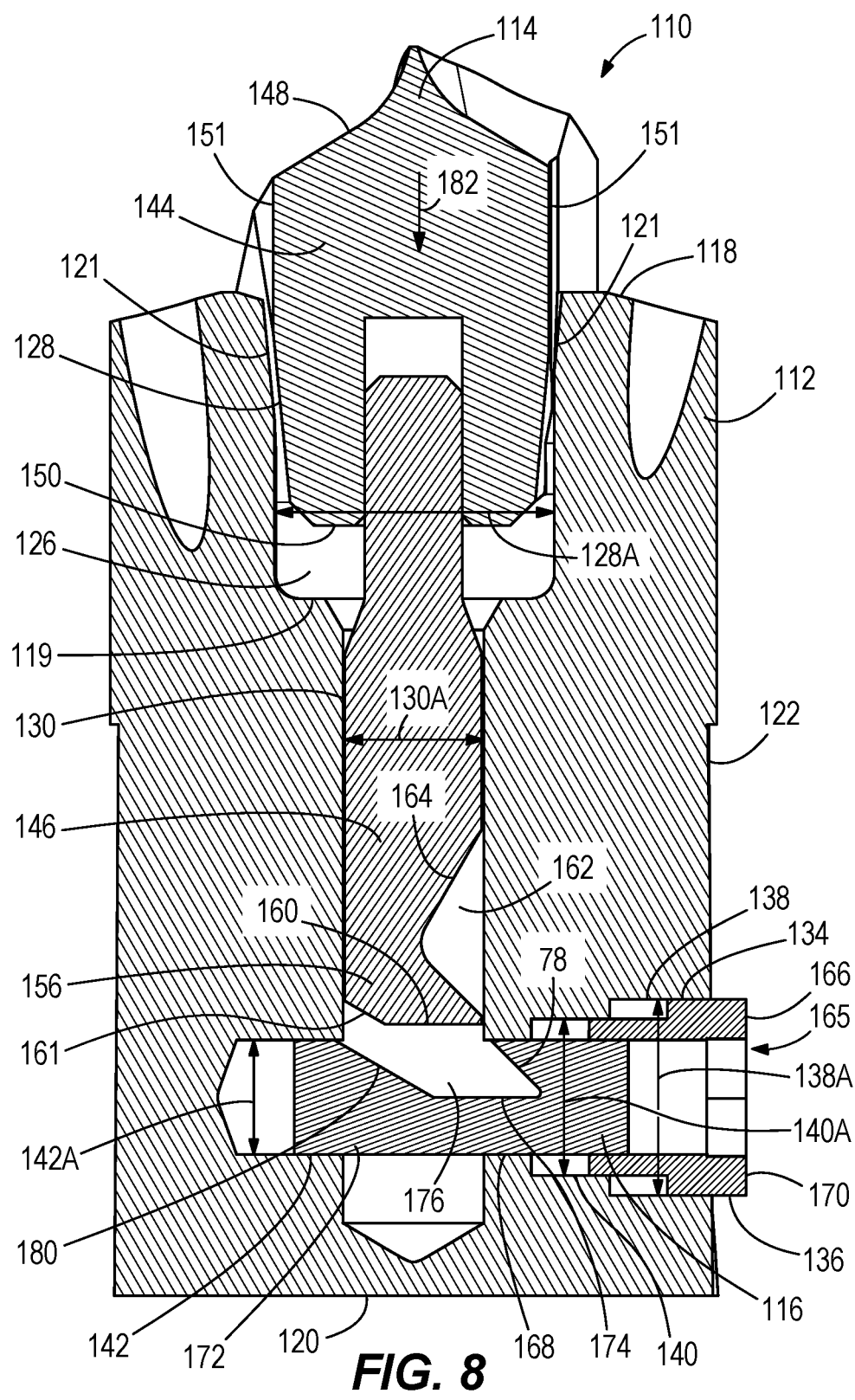
FIG. 8 illustrates a cross-section view through line 8-8 of FIG. 6 with the retaining member retracted and the insert in an unlocked position.

As shown in FIG. 8, when the insert 114 is initially installed into the center hole 126 of the drill body 112 of the modular drill 110, the retaining member 116 is partially retracted within the side hole 134 so that the clamp surface 178 of the retaining member 116 is not blocking the second portion 130 of the center hole 126. At this time, the stem 156 of the insert 114 is inserted through the first portion 128 of the center hole 126 into the second portion 130 of the center hole 126 in direction 182 until the angled inner walls 121 of the drill body 112 press against the abutment surfaces 151 of the first portion 144 of the insert 114 with enough force to prevent further movement of the insert 114.

Figure 9:
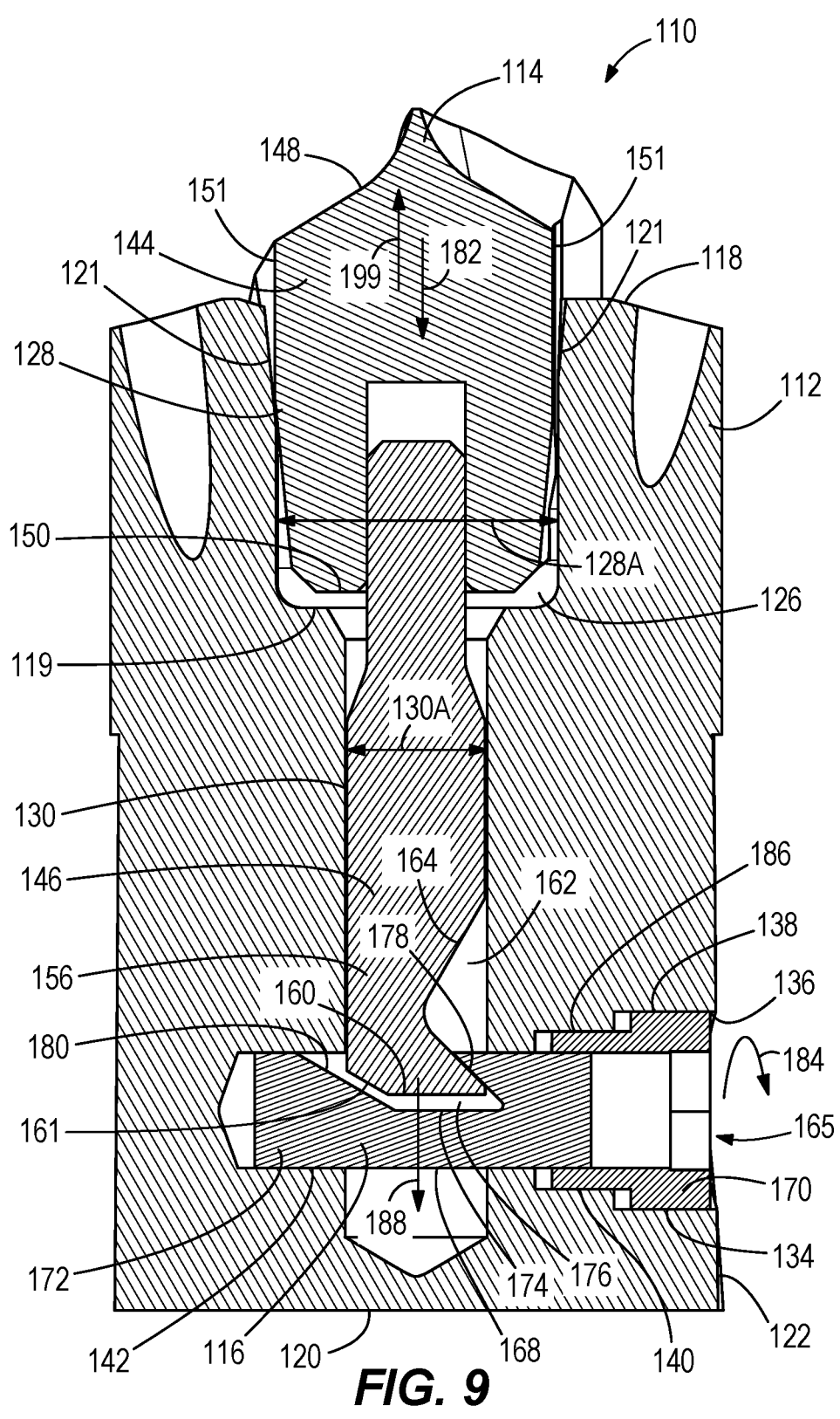
FIG. 9 illustrates a cross-section view through line 8-8 of FIG. 6 with the retaining member advancing towards a clamping position but the insert still in an unlocked position.

When this happens, as shown in FIG. 9, the notch 164 of the stem 156 of the insert 114 is disposed adjacent the side hole 134. The torque nut 170 of the retaining member 116 is then rotated, using a tool (not shown) inserted through the actuation location 136, in direction 184 within the side hole 134 so that the retaining member 116 advances in direction 188 within the side hole 134. This causes the clamp surface 178 of the lock-rod pin 172 to contact the notch 164 of the stem 156 of the insert 114. The torque nut 170, the lock-rod pin 172, and the side hole 134 of the drill body 112 are threaded in such a way that rotation of the torque nut 170 creates axial movement of the lock-rod pin 172.

Figure 10:
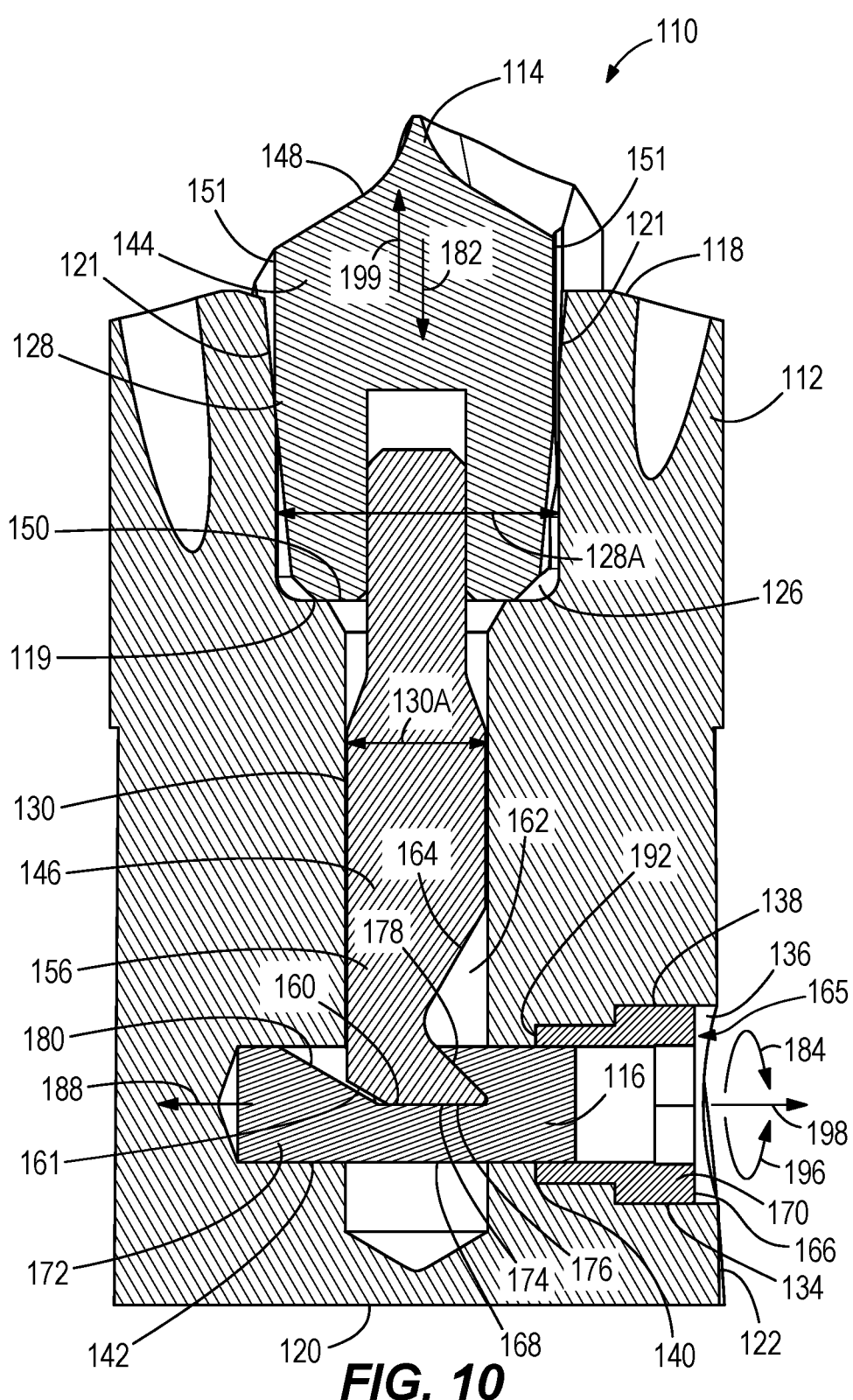
FIG. 10 illustrates a cross-section through line 8-8 of FIG. 6 with the retaining member having advanced into a clamping position locking the insert in place in a locked position.
Figures 11, 12:
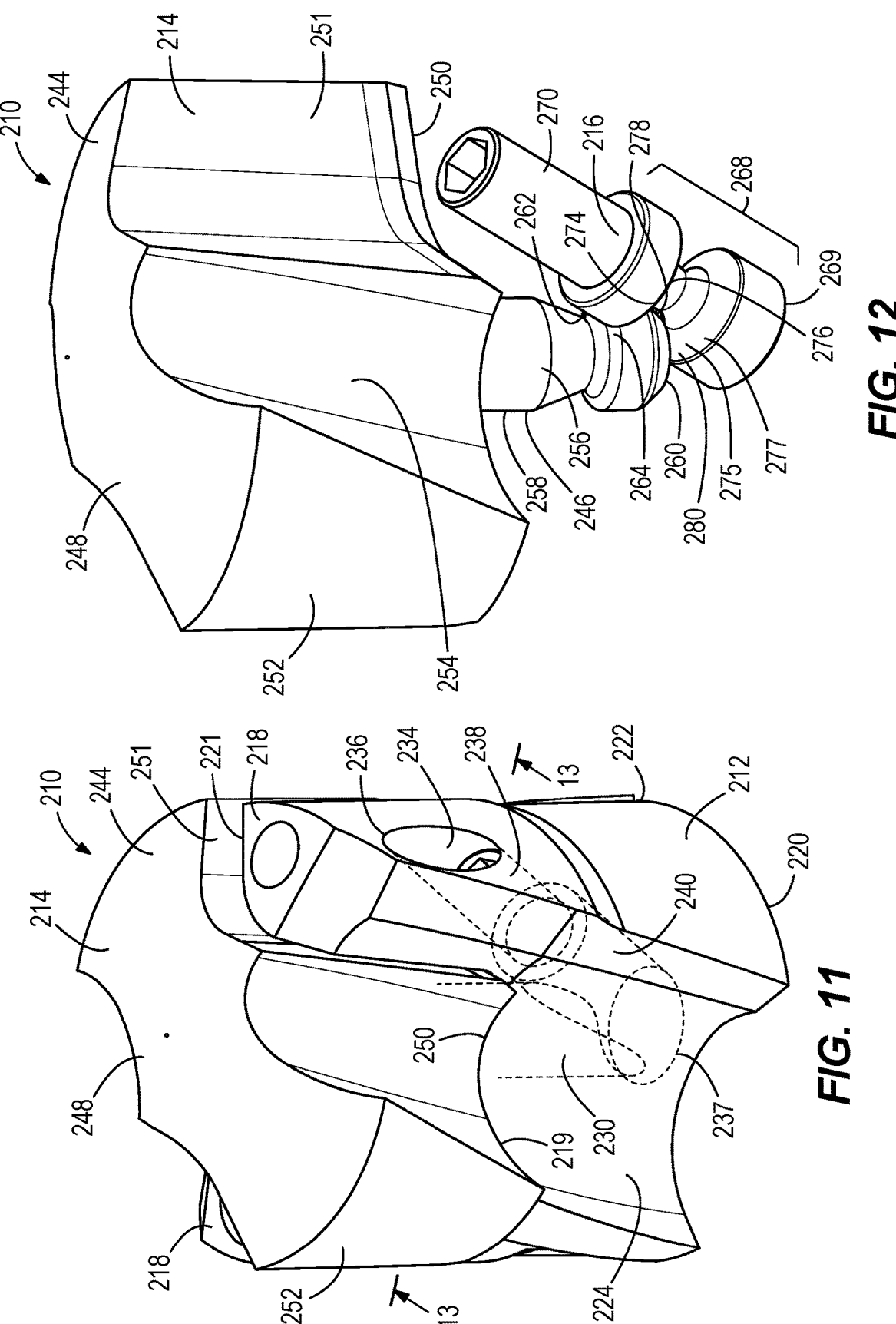
FIG. 11 illustrates a front perspective view of still another embodiment of a modular drill.
FIG. 12 illustrates a front perspective view of the modular drill of FIG. 11 with the drill body removed to show the insert and the retaining member.

As shown in FIG. 10, as the torque nut 170 of the retaining member 116 is rotated further in direction 184 within the side hole 134 the lock-rod pin 172 advances further in direction 188 so that the clamp surface 178 of the lock-rod pin 172 pushes against the notch 164 of the stem 156 of the insert 114 forcing the insert 114 to move in direction 182 in the center hole 126 into a locked position within the center hole 126 of the drill body 112. At this time, the torque nut 170 cannot be rotated further in direction 184. Moreover, at this time, the insert 114 cannot move further in direction 182 within the center hole 126 of the drill body 112 due to axial abutment surface 150 of the insert 114 abutting against abutment surface 119 of the drill body 112. At this point the insert 114 and the drill body 112 will form an interference fit providing a secure coupling.

To bump the insert 114 out of the locked position in the center hole 126 of the drill body 112, as shown in FIG. 9, the torque nut 170 is rotated using the tool (not shown) inserted through the actuation location 136 in direction 196, opposite to direction 184, in the side hole 134 causing the retaining member 116 to move in direction 198 within the side hole 134. This causes the bump surface 180 to bump against the adjacent surface 161 of the stem 156 of the insert 114 forcing the insert 114 to move in direction 199 which bumps the insert 114 out of the locked position allowing the insert 114 to be removed from the center hole 126 of the drill body 112. It is noted that the clamp surface 178 of the retaining member 116 is disposed closer to the actuation location 136 of the drill body 112 than the bump surface 180 of the retaining member 116. The position and length of bump surface 180 creates a limit position for the insert 114 before the clamping can be done. Depending on manufacturing tolerances of drill body distance 128A and correspondent distance between abutment surfaces 151 of insert 114, the location of the insert 114 as it is placed into the drill body 112 can vary, so bump surface 180 can act as a stop preventing insert 114 from dropping to a position where the mating members 174 and 162 cannot engage properly during clamping.

As shown collectively in FIGS. 11-15, in one embodiment a modular drill 210 includes a drill body 212, an insert 214, and a retaining member 216. The drill body 212 comprises top surfaces 218, abutment surface 219, bottom surface 220, inner walls 221 extending between the top surfaces 218 and the abutment surface 219, and outer surfaces 222 extending between the top surfaces 218 and the bottom surface 220. The outer surfaces 222 are convex. Flutes 224 are cut into the outer surfaces 222. The flutes 224 extend between the abutment surface 219 and the bottom surface 220. The flutes 224 are concave for carrying material cut by the modular drill 210 away from the insert 214. A center hole 226 extends through the abutment surface 219. The center hole 226 comprises first portion 228 and second portion 230. The distance 228A of the first portion 228, which varies, is larger than the diameter 230A of the second portion 230. A side hole 234 extends completely through the drill body 210 from an actuation location 236 through an entrance location 237 of the drill body 210. The side hole 234 comprises first portion 238 and second portion 240. The diameter 238A of the first portion 238 at the actuation location 236 is smaller than the diameter 240A of the second portion 240 at the entrance location 237. The center hole 226 and the side hole 234 intersect within the drill body 212 at a non-perpendicular angle. In other embodiments, the center hole 226 and the side hole 234 may intersect within the drill body 212 at a perpendicular angle.

The insert 214 comprises a first portion 244 and a second portion 246. The first portion 244 and the second portion 246 form one integral component. In other embodiments, the first portion 244 and the second portion 246 may comprise separate attached components. The first portion 244 comprises a head of the insert 214. The first portion 244 comprises cutting surface 248, axial abutment surface 250, abutment surfaces 251, and outer surfaces 252. The abutment surfaces 251 and the outer surfaces 252 both extend between cutting surface 248 and axial abutment surface 250. Flutes 254 are cut into the outer surfaces 252. The flutes 254 extend between cutting surface 248 and axial abutment surface 250. The second portion 246 comprises a stem 256 of the insert 214. The stem 256 comprises outer surface 258 and bottom surface 260. Mating member 262 is cut into the stem 256. Mating member 262 comprises a circular groove 264. In other embodiments, the mating member 262 may vary.

The retaining member 216 comprises a screw having a first portion 268 and a second portion 270. The first portion 268 of the screw comprises a head 269 and the second portion 270 comprises a pin 272. The first portion 268 and the second portion 270 comprise one integral component. In other embodiments, the first portion 268 and the second portion 270 may comprise separate attached components. The head 269 comprises mating members 274 and 275 cut into the head 269. Mating members 274 and 275 comprises respective circular grooves 276 and 277. Circular groove 276 comprises a clamp surface 278, and circular groove 277 comprises a bump surface 280. The clamp surface 278 and the bump surface 280 are disposed non-parallel relative to one another. In other embodiments, the mating members 274 and 275 may vary.

Figure 13:
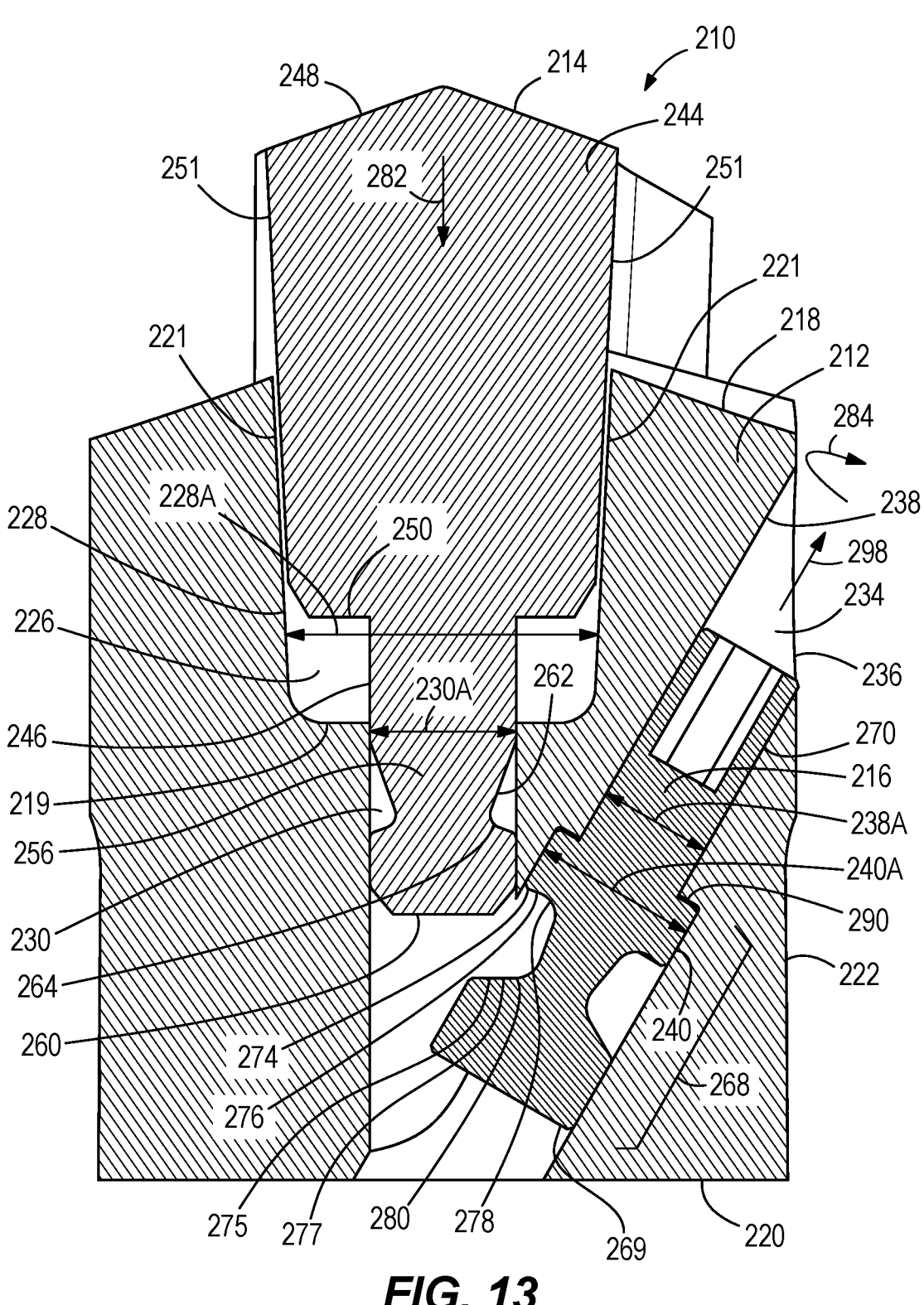
FIG. 13 illustrates a cross-section view through line 13-13 of FIG. 11 with the retaining member retracted and the insert in an unlocked position.

As shown in FIG. 13, when the insert 214 is initially installed into the center hole 226 of the drill body 212 of the modular drill 210, the retaining member 216 is inserted through the entrance location 237 (see FIG. 11) of the side hole 234 of the drill body 210. At this time, the retaining member 216 is moved in direction 298 using an actuation tool (not shown) inserted through the actuation location 236 to engage and rotate the second portion 270 of the retaining member 216 in direction 284 causing the second portion 270 of the retaining member 216 to threadedly engage the first portion 238 of the side hole 234. The retaining member 216 is advanced in direction 298 within the side hole 234 until the first portion 268 of the retaining member 216 abuts against stop shoulder 290 of the side hole 234 of the drill body 210 preventing the retaining member 216 from moving further in direction 298 through the side hole 234 and out of the actuation location 236. At this time, the clamp surface 278 of the retaining member 216 is not blocking the second portion 230 of the center hole 226 and the insert 214 is removable from the center hole 226 of the drill body 212. At this time, the stem 256 of the insert 214 is inserted through the first portion 228 of the center hole 226 into the second portion 230 of the center hole 226 in direction 282 until the angled inner walls 221 of the drill body 212 press against the abutment surfaces 251 of the first portion 244 of the insert 214 with enough force to prevent further movement of the insert 214 or bottom surface 260 of stem 256 contacts bump surface 280.

Figure 14:
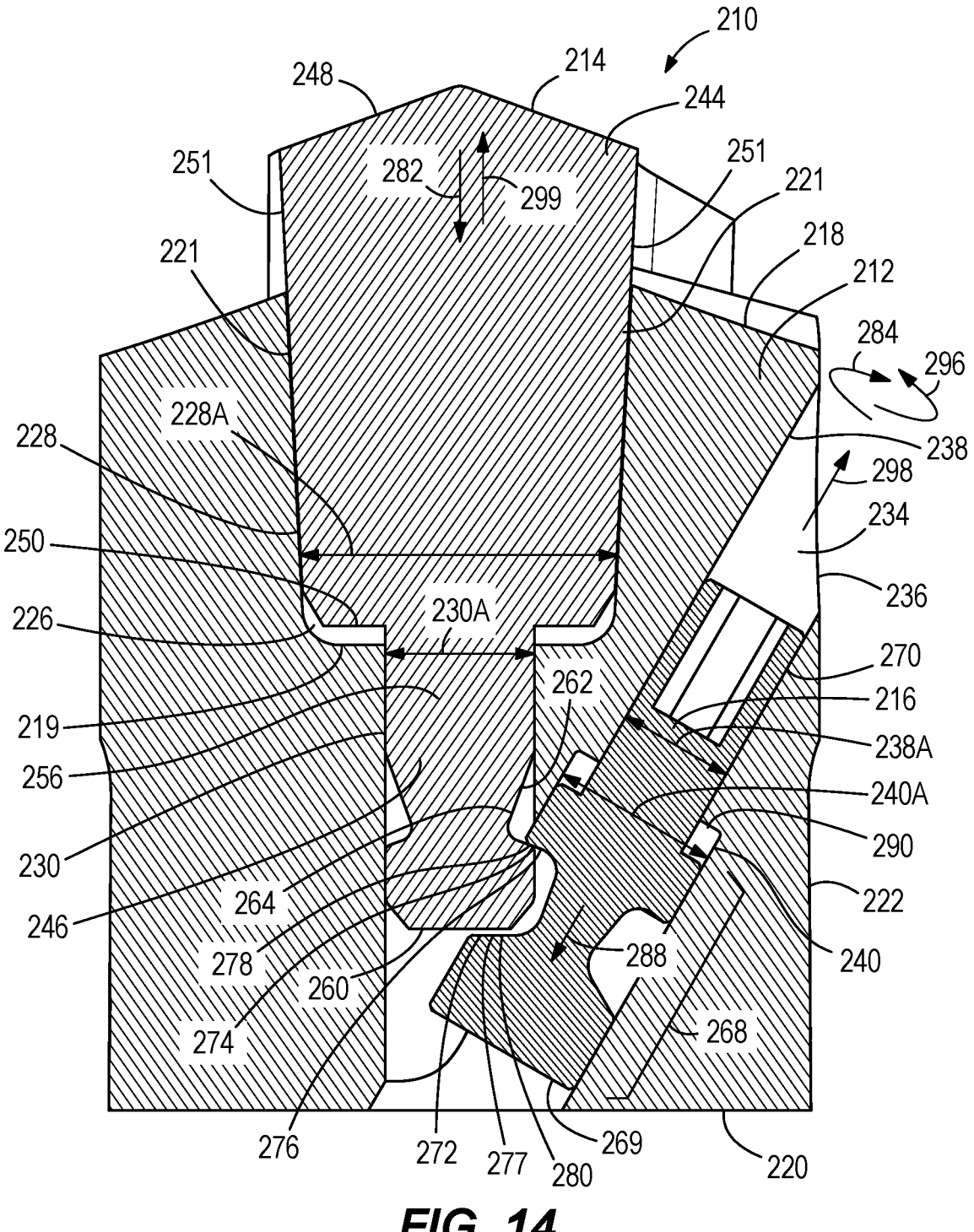
FIG. 14 illustrates a cross-section view through line 13-13 of FIG. 11 with the retaining member advancing towards a clamping position but the insert still in an unlocked position.

When this happens, as shown in FIG. 14, the circular groove 264 of the stem 256 of the insert 214 is disposed adjacent the side hole 234. The retaining member 216 is then rotated, using the tool (not shown) inserted through the actuation location 236, in direction 296 to move the retaining member 216 within the side hole 234 in direction 288. During this rotation, the second portion 270 of the retaining member 216 threadedly engages the first portion 238 of the side hole 234 and the first portion 268 of the retaining member 216 advances in the second portion 240 of the side hole 234. This causes the clamp surface 278 of the retaining member 216 to contact the circular groove 264 of the stem 256 of the insert 214.

Figure 15:
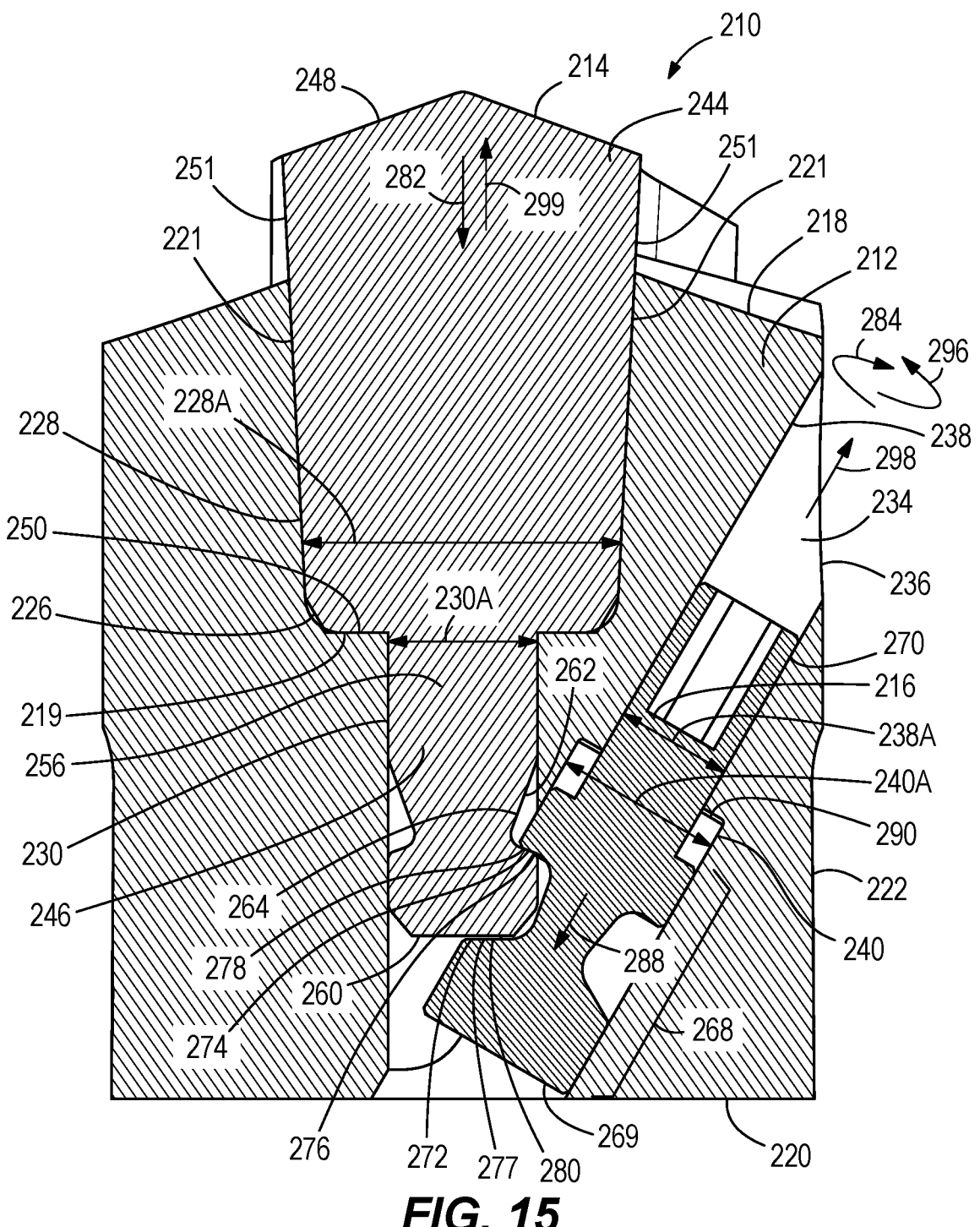
FIG. 15 illustrates a cross-section through line 13-13 of FIG. 11 with the retaining member having advanced into a clamping position locking the insert in place in a locked position.
Figures 16, 17:
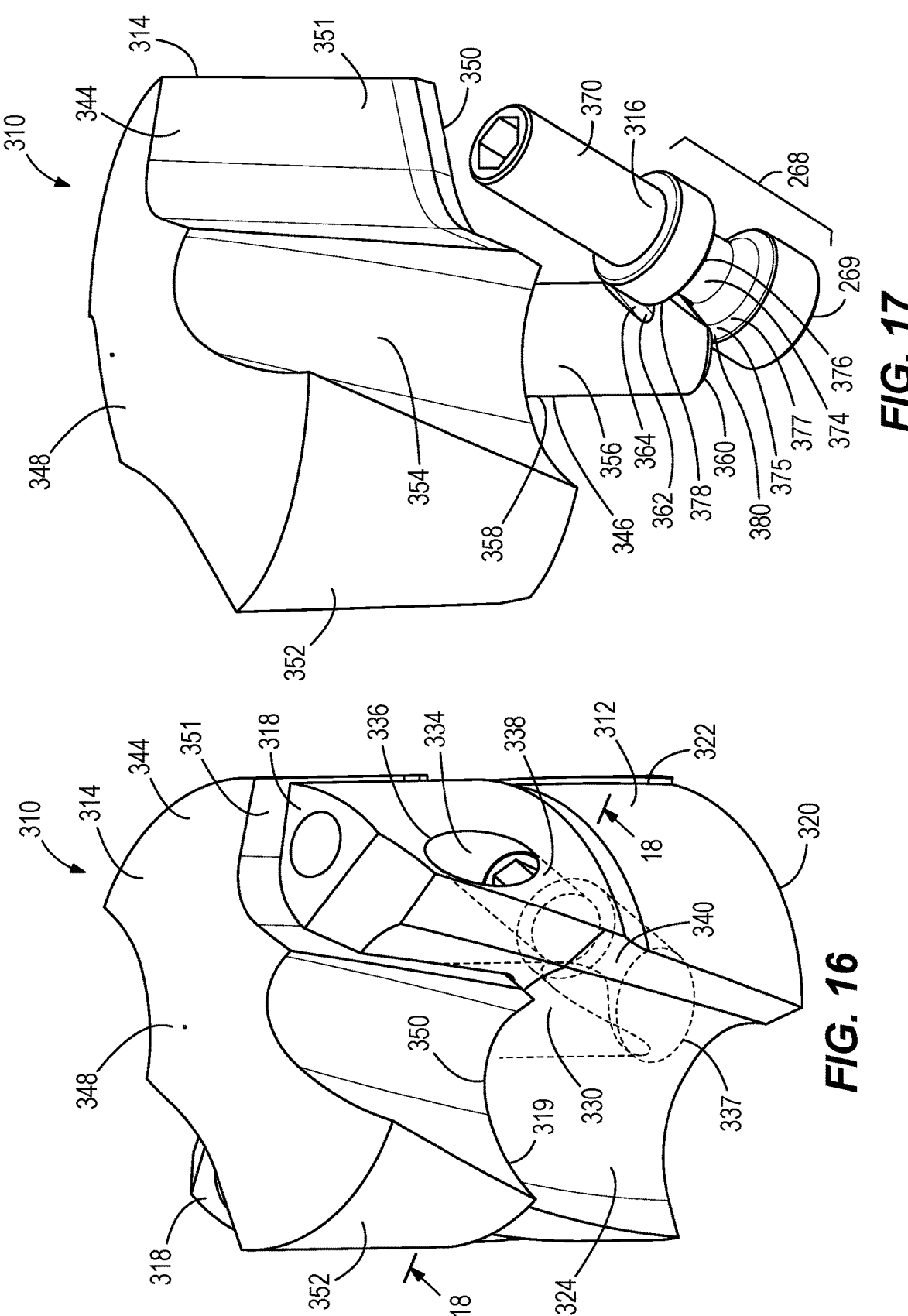
FIG. 16 illustrates a front perspective view of still another embodiment of a modular drill.
FIG. 17 illustrates a front perspective view of the modular drill of FIG. 16 with the drill body removed to show the insert and the retaining member.

As shown in FIG. 15, as the retaining member 216 is rotated further in direction 296 within the side hole 234 the retaining member 216 advances further in direction 288 so that the clamp surface 278 of the retaining member 216 pushes against the circular groove 264 of the stem 256 of the insert 214 forcing the insert 214 to advance in direction 282 in the center hole into a locked position within the center hole 226 of the drill body 212. At time, the insert 214 cannot move further in direction 282 within the center hole 226 of the drill body 212 due to the axial abutment surface 250 of the insert 214 abutting against the abutment surface 219.

To bump the insert 214 out of the locked position in the center hole 226 of the drill body 212, as shown in FIG. 14, the retaining member 216 is rotated, using the tool (not shown) inserted at the actuation location 236, in direction 284 in the side hole 234 causing the retaining member 216 to move in direction 298 within the side hole 234. This causes the bump surface 280 to bump against the bottom surface 260 of the stem 256 of the insert 214 forcing the insert 214 to move in direction 299 which bumps the insert 214 out of the locked position allowing the insert 214 to be removed from the center hole 226 of the drill body 212.

It is noted that the clamp surface 278 of the retaining member 216 is disposed closer to the actuation location 236 of the drill body 212 than the bump surface 280 of the retaining member 216. The position and length of bump surface 280 creates a limit position for the insert 214 before the clamping can be done. Depending on manufacturing tolerances of drill body distance 228A and correspondent distance between abutment surfaces 251 of insert 214, the location of the insert 214 as it is placed into the drill body 212 can vary, so bump surface 280 can act as a stop preventing insert 214 from dropping to a position where the mating members 274 and 262 cannot engage properly during clamping. By using the entrance location 237, which is disposed below both the insert 214 and the actuation location 236, to insert the retaining member 216 into the side hole 234, the first portion 238 of the side hole 234 at the actuation location 236 may be made substantially smaller than the second portion 240 of the side hole 234. This greatly increases the strength of the drill body 212 and allows for additional room for coolant holes to be created. Moreover, the higher stroke resulting from the larger bump surface 280 reduces the need for tight tolerances of the components of the modular drill 210 which further reduces cost.

As shown collectively in FIGS. 16-20, in one embodiment a modular drill 310 includes a drill body 312, an insert 314, and a retaining member 316. The drill body 312 comprises top surfaces 318, abutment surface 319, bottom surface 320, inner walls 321 extending between the top surfaces 318 and the abutment surface 319, and outer surfaces 322 extending between the top surfaces 318 and the bottom surface 320. The outer surfaces 322 are convex. Flutes 324 are cut into the outer surfaces 322. The flutes 324 extend between the abutment surface 319 and the bottom surface 320. The flutes 324 are concave for carrying material cut by the modular drill 310 away from the insert 314. A center hole 326 extends through the abutment surface 319. The center hole 326 comprises first portion 328 and second portion 330. The distance 328A of the first portion 328, which varies, is larger than the diameter 330A of the second portion 330. A side hole 334 extends completely through the drill body 310 from an actuation location 336 through an entrance location 337 of the drill body 310. The side hole 334 comprises first portion 338 and second portion 340. The diameter 338A of the first portion 338 at the actuation location 336 is smaller than the diameter 340A of the second portion 340 at the entrance location 337. The center hole 326 and the side hole 334 intersect within the drill body 312 at a non-perpendicular angle. In other embodiments, the center hole 326 and the side hole 334 may intersect within the drill body 312 at a perpendicular angle.

The insert 314 comprises a first portion 344 and a second portion 346. The first portion 344 and the second portion 346 form one integral component. In other embodiments, the first portion 344 and the second portion 346 may comprise separate attached components. The first portion 344 comprises a head of the insert 314. The first portion 344 comprises cutting surface 348, axial abutment surface 350, abutment surfaces 351, and outer surfaces 352. The abutment surfaces 351 and the outer surfaces 352 both extend between cutting surface 348 and axial abutment surface 350. Flutes 354 are cut into the outer surfaces 352. The flutes 354 extend between cutting surface 348 and axial abutment surface 350. The second portion 346 comprises a stem 356 of the insert 314. The stem 356 comprises outer surface 358 and bottom surface 360. Mating member 362 is cut into the stem 356. Mating member 362 comprises a notch 364. In other embodiments, the mating member 362 may vary.

The retaining member 316 comprises a screw having a first portion 368 and a second portion 370. The first portion 368 of the screw comprises a head 369 and the second portion 370 comprises a pin 372. The first portion 368 and the second portion 370 comprise one integral component. In other embodiments, the first portion 368 and the second portion 370 may comprise separate attached components. The head 369 comprises mating members 374 and 375 cut into the head 369. Mating members 374 and 375 comprises respective circular grooves 376 and 377. Circular groove 376 comprises a clamp surface 378, and circular groove 377 comprises a bump surface 380. The clamp surface 378 and the bump surface 380 are disposed non-parallel relative to one another. In other embodiments, the mating members 374 and 375 may vary.

Figure 18:
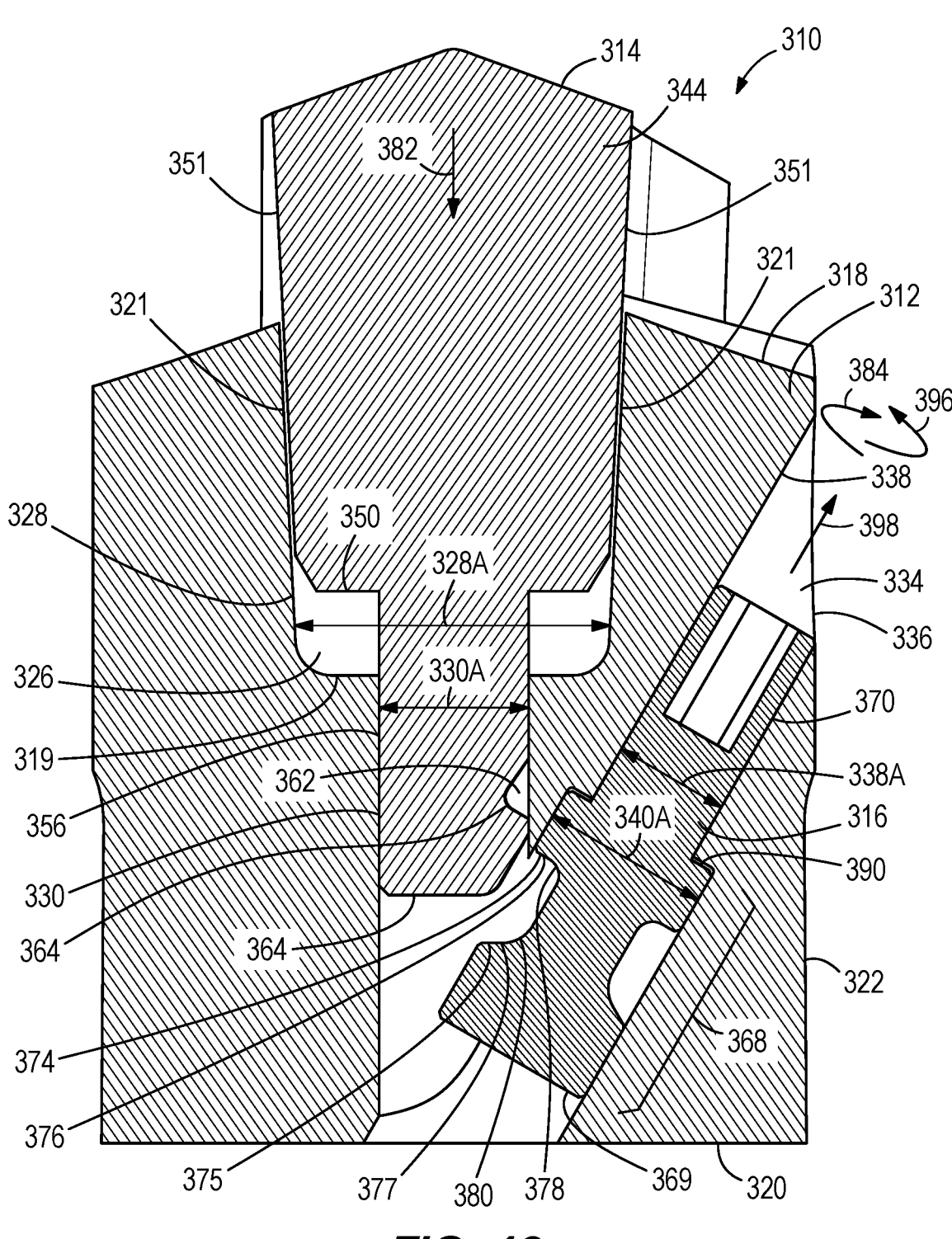
FIG. 18 illustrates a cross-section view through line 18-18 of FIG. 16 with the retaining member retracted and the insert in an unlocked position.

As shown in FIG. 18, when the insert 314 is initially installed into the center hole 326 of the drill body 312 of the modular drill 310, the retaining member 316 is inserted through the entrance location 337 (see FIG. 16) of the side hole 334 of the drill body 310. At this time, the retaining member 316 is moved in direction 398 using an actuation tool (not shown) inserted through the actuation location 336 to engage and rotate the second portion 370 of the retaining member 316 in direction 384 causing the second portion 370 of the retaining member 316 to threadedly engage the first portion 338 of the side hole 334. The retaining member 316 is advanced in direction 398 within the side hole 334 until the first portion 368 of the retaining member 316 abuts against stop shoulder 390 of the side hole 334 of the drill body 310 preventing the retaining member 316 from moving further in direction 398 through the side hole 334 and out of the actuation location 336. At this time, the clamp surface 378 of the retaining member 316 is not blocking the second portion 330 of the center hole 326 and the insert 314 is removable from the center hole 326 of the drill body 312. At this time, the stem 356 of the insert 314 is inserted through the first portion 328 of the center hole 326 into the second portion 330 of the center hole 326 in direction 382 until the angled inner walls 321 of the drill body 312 press against the abutment surfaces 351 of the first portion 344 of the insert 314 with enough force to prevent further movement of the insert 314 or bottom surface 360 of stem 356 contacts bump surface 380.

Figure 19:
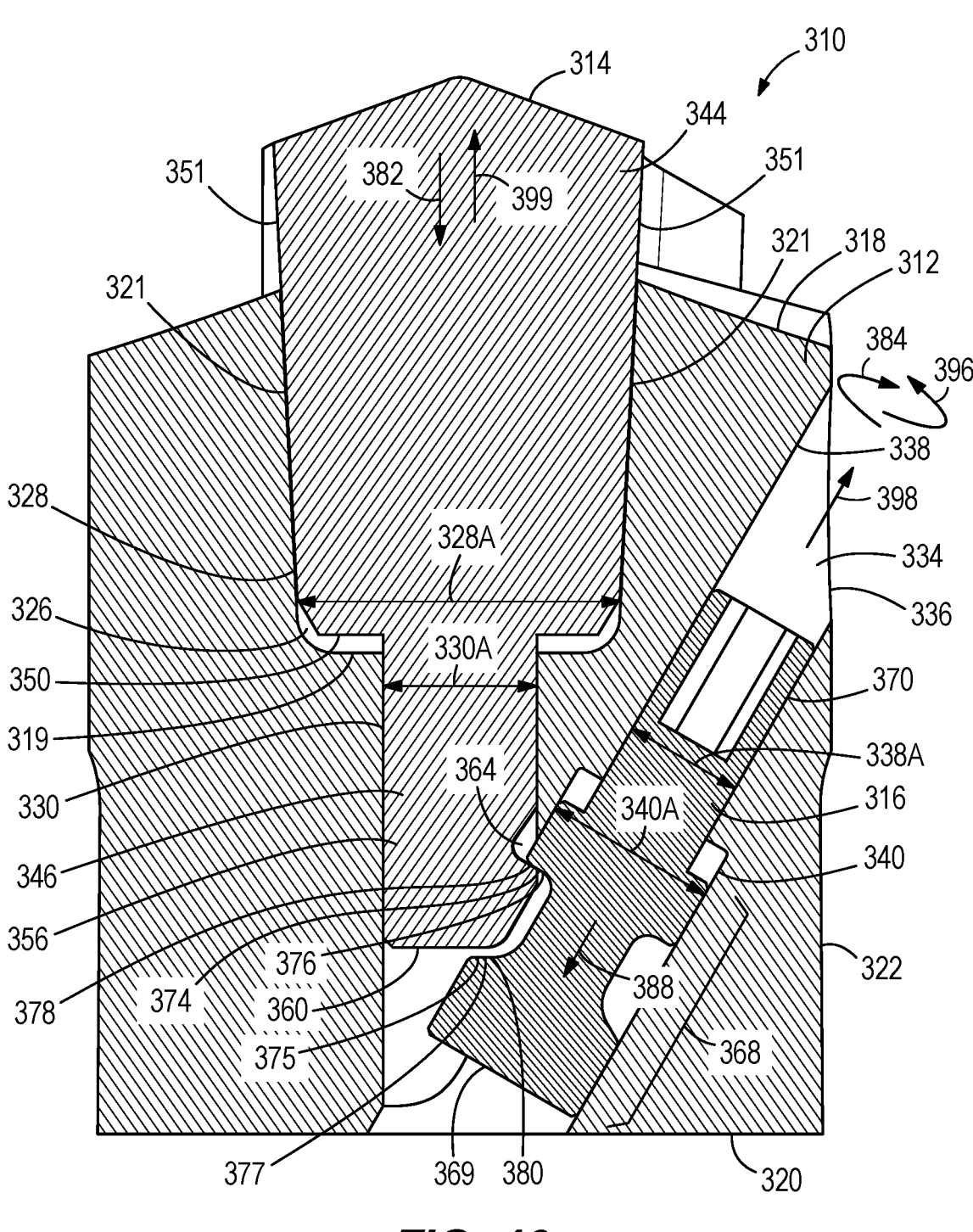
FIG. 19 illustrates a cross-section view through line 18-18 of FIG. 16 with the retaining member advancing towards a clamping position but the insert still in an unlocked position.

When this happens, as shown in FIG. 19, the notch 364 of the stem 356 of the insert 314 is disposed adjacent the side hole 334. The retaining member 316 is then rotated, using the tool (not shown) inserted through the actuation location 336, in direction 396 to move the retaining member 316 within the side hole 334 in direction 388. During this rotation, the second portion 370 of the retaining member 316 threadedly engages the first portion 338 of the side hole 334 and the first portion 368 of the retaining member 316 advances in the second portion 340 of the side hole 334. This causes the clamp surface 378 of the retaining member 316 to contact the notch 364 of the stem 356 of the insert 314.

Figure 20:
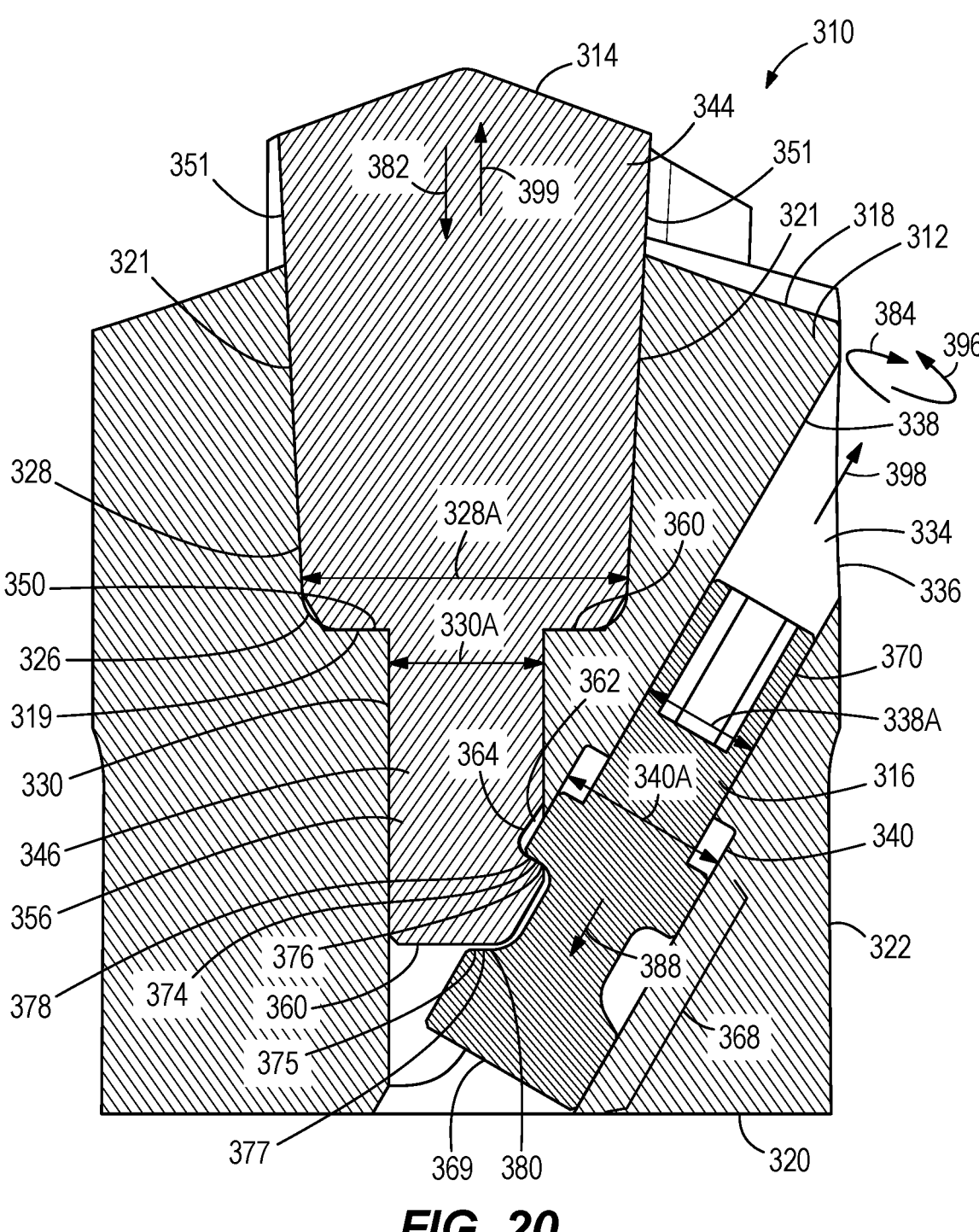
FIG. 20 illustrates a cross-section through line 18-18 of FIG. 16 with the retaining member having advanced into a clamping position locking the insert in place in a locked position.

As shown in FIG. 20, as the retaining member 316 is rotated further in direction 396 within the side hole 334 the retaining member 316 advances further in direction 388 so that the clamp surface 378 of the retaining member 316 pushes against the notch 364 of the stem 356 of the insert 314 forcing the insert 314 to advance in direction 382 in the center hole into a locked position within the center hole 326 of the drill body 312. At time, the insert 314 cannot move further in direction 382 within the center hole 326 of the drill body 312 due to the axial abutment surface 350 of the insert 314 abutting against the abutment surface 319.

To bump the insert 314 out of the locked position in the center hole 326 of the drill body 312, as shown in FIG. 19, the retaining member 316 is rotated, using the tool (not shown) inserted at the actuation location 336, in direction 384 in the side hole 334 causing the retaining member 316 to move in direction 398 within the side hole 334. This causes the bump surface 380 to bump against the bottom surface 360 of the stem 356 of the insert 314 forcing the insert 314 to move in direction 399 which bumps the insert 314 out of the locked position allowing the insert 314 to be removed from the center hole 326 of the drill body 312.

It is noted that the clamp surface 378 of the retaining member 316 is disposed closer to the actuation location 336 of the drill body 312 than the bump surface 380 of the retaining member 316. The position and length of bump surface 380 creates a limit position for the insert 314 before the clamping can be done. Depending on manufacturing tolerances of drill body distance 328A and correspondent distance between abutment surfaces 351 of insert 314, the location of the insert 314 as it is placed into the drill body 312 can vary, so bump surface 380 can act as a stop preventing insert 314 from dropping to a position where the mating members 374 and 362 cannot engage properly during clamping. By using the entrance location 337, which is disposed below both the insert 314 and the actuation location 336, to insert the retaining member 316 into the side hole 334, the first portion 338 of the side hole 334 may be made substantially smaller than the second portion 340 of the side hole 334. This greatly increases the strength of the drill body 312 and allows for additional room for coolant holes to be created. Moreover, the higher stroke resulting from the larger bump surface 380 reduces the need for tight tolerances of the components of the modular drill 310 which further reduces cost.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

The invention claimed is:

1. A modular drill comprising: a drill body comprising a center hole extending through a first surface of the drill body, and a side hole extending at an actuation location through a second surface of the drill body, the center hole and the side hole intersecting within the drill body; an insert moveably disposed in the center hole; and a retaining member threadedly attached to and moveably disposed in the side hole, the retaining member comprising a clamp surface and a bump surface, the clamp surface disposed closer to the actuation location than the bump surface; wherein when the retaining member is rotated in a first direction in the side hole the clamp surface forces the insert into a locked position within the center hole of the drill body, and when the retaining member is rotated in a second direction, opposite to the first direction, in the side hole the bump surface bumps the insert out of the locked position allowing the insert to be removed from the center hole of the drill body, wherein the insert comprises a notch and a bottom surface at one end, wherein in the locked position clamp surface is disposed against the notch and in the out of the locked position the bump surface is disposed against the bottom surface or an adjacent surface of the insert, and wherein the retaining member comprises a second notch, the second notch comprising the clamp surface and the bump surface, the clamp surface disposed non-parallel relative to the bump surface.

2. The modular drill of claim 1 wherein the retaining member comprises first and second circular grooves, the clamp surface comprising the first circular groove and the bump surface comprising the second circular groove.

3. The modular drill of claim 1 wherein the insert comprises a first circular groove and a bottom surface, wherein in the locked position the clamp surface is disposed against the first circular groove and in the out of the locked position the bump surface is disposed against the bottom surface.

4. The modular drill of claim 3 wherein the retaining member comprises second and third circular grooves, the second circular groove comprising the clamp surface and the third circular groove comprising the bump surface.

5. The modular drill of claim 1 wherein the bump surface is configured to stop the insert from dropping to a position in which the clamp surface cannot force the insert into the locked position.

6. The modular drill of claim 1 wherein the retaining member further comprises a torque screw comprising a torque nut, and a lock-rod pin rotatably attached to the torque nut, wherein the lock-rod pin comprises the clamp surface and the bump surface.

7. The modular drill of claim 1 wherein the side hole extends completely through the drill body from the actuation location through an entrance location, the side hole comprises a first portion having a first diameter at the actuation location and a second portion having a second diameter at the entrance location, the second diameter is larger than the first diameter, and the entrance location is disposed below both the insert and the actuation location.

8. The modular drill of claim 1 wherein the drill body further comprises a stop shoulder located within the side hole, the stop shoulder positioned and sized to stop the retaining member from moving through the side hole out of the actuation location, wherein when the retaining member is abutted against the stop shoulder the insert is removable from the center hole of the drill body.

9. A modular drill comprising: a drill body comprising a center hole extending through a first surface of the drill body, and a side hole extending at an actuation location through a second surface of the drill body, the center hole and the side hole intersecting within the drill body; an insert moveably disposed in the center hole; and a retaining member moveably disposed in the side hole, the retaining member comprising a torque screw threadedly attached to the side hole, the torque screw comprising a torque nut and a lock-rod pin rotatably attached to the torque nut, wherein the lock-rod pin comprises a clamp surface and a bump surface; wherein when the retaining member is rotated in a first direction in the side hole the clamp surface forces the insert into a locked position within the center hole of the drill body, and when the retaining member is rotated in a second direction, opposite to the first direction, in the side hole the bump surface bumps the insert out of the locked position allowing the insert to be removed from the center hole of the drill body, wherein the insert comprises a notch and a bottom surface at one end, wherein in the locked position clamp surface is disposed against the notch and in the out of the locked position the bump surface is disposed against the bottom surface or an adjacent surface of the insert, and wherein the retaining member comprises a second notch, the second notch comprising the clamp surface and the bump surface, the clamp surface disposed non-parallel relative to the bump surface.

10. The modular drill of claim 9 wherein the bump surface is configured to stop the insert from dropping to a position in which the clamp surface cannot force the insert into the locked position.

11. A modular drill comprising: a drill body comprising a center hole extending through a surface of the drill body, a side hole extending completely through the drill body from an actuation location through an entrance location, the side hole comprising a first portion having a first diameter at the actuation location and a second portion having a second diameter at the entrance location, the second diameter larger than the first diameter, the center hole and the side hole intersecting within the drill body; an insert moveably disposed in the center hole, the entrance location disposed below both the insert and the actuation location; and a retaining member threadedly attached to and moveably disposed in the side hole, the retaining member comprising a clamp surface and a bump surface; wherein when the retaining member is rotated in a first direction in the side hole the clamp surface forces the insert into a locked position within the center hole of the drill body, and when the retaining member is rotated in a second direction, opposite to the first direction, in the side hole the bump surface bumps the insert out of the locked position allowing the insert to be removed from the center hole of the drill body, wherein the insert comprises a notch and a bottom surface at one end, wherein in the locked position the clamp surface is disposed against the notch and in the out of the locked position the bump surface is disposed against the bottom surface, and wherein the retaining member comprises first and second circular grooves, the clamp surface comprising the first circular groove and the bump surface comprising the second circular groove.

12. The modular drill of claim 11 wherein the insert comprises a first circular groove and a bottom surface, wherein in the locked position the clamp surface is disposed against the first circular groove and in the out of the locked position the bump surface is disposed against the bottom surface.

13. The modular drill of claim 12 wherein the retaining member comprises second and third circular grooves, the second circular groove comprising the clamp surface and the third circular groove comprising the bump surface.

14. The modular drill of claim 11 wherein the bump surface is configured to stop the insert from dropping to a position in which the clamp surface cannot force the insert into the locked position.

15. The modular drill of claim 11 wherein the drill body further comprises a stop shoulder located within the side hole, the stop shoulder positioned and sized to stop the retaining member from moving through the side hole out of the actuation location, wherein when the retaining member is abutted against the stop shoulder the insert is removable from the center hole of the drill body.

* * * * *